(12) United States Patent
Kawakami et al.

(10) Patent No.: US 8,045,043 B2
(45) Date of Patent: Oct. 25, 2011

(54) OPTICAL MODULE AND IMAGING DEVICE

(75) Inventors: Shojiro Kawakami, Miyagi (JP); Tetsuya Ogata, Kanagawa (JP)

(73) Assignee: Ricoh Company, Inc., Tokyo (JP)

( * ) Notice: Subject to any disclaimer, the term of this patent is extended or adjusted under 35 U.S.C. 154(b) by 117 days.

(21) Appl. No.: 12/159,489

(22) PCT Filed: Dec. 27, 2006

(86) PCT No.: PCT/JP2006/326398
§ 371 (c)(1),
(2), (4) Date: Jun. 16, 2010

(87) PCT Pub. No.: WO2007/074945
PCT Pub. Date: Jul. 5, 2007

(65) Prior Publication Data
US 2010/0253827 A1     Oct. 7, 2010

(30) Foreign Application Priority Data
Dec. 29, 2005   (JP) .................................. 2005-380643

(51) Int. Cl.
*H04N 5/225* (2006.01)
(52) U.S. Cl. ...................................................... 348/340
(58) Field of Classification Search ................... 348/340
See application file for complete search history.

(56) References Cited

U.S. PATENT DOCUMENTS

| | | | | |
|---|---|---|---|---|
| 6,046,787 A * | 4/2000 | Nishiguchi | | 349/129 |
| 6,128,059 A * | 10/2000 | Nishiguchi | | 349/129 |
| 6,239,853 B1 * | 5/2001 | Winker et al. | | 349/117 |
| 7,492,408 B2 * | 2/2009 | Ito | | 348/335 |
| 7,701,501 B2 * | 4/2010 | Ito et al. | | 348/335 |
| 2006/0044454 A1 * | 3/2006 | Kuwakino | | 348/350 |
| 2006/0082998 A1 * | 4/2006 | Inoko | | 362/268 |
| 2006/0245069 A1 * | 11/2006 | Pinho | | 359/634 |

FOREIGN PATENT DOCUMENTS

DE     600 13 313 T2     1/2005
(Continued)

OTHER PUBLICATIONS

International Search Report of PCT/JP2006/326398 dated Mar. 6, 2007 with a mailing date of Mar. 13, 2007.

(Continued)

*Primary Examiner* — Lin Ye
*Assistant Examiner* — Amy Hsu
(74) *Attorney, Agent, or Firm* — Myers Wolin, LLC

(57) ABSTRACT

It is an object of the present invention to provide an optical module which can extract only light components satisfying predetermined conditions, and an imaging device comprising the optical module. The optical module (10) comprises a first plate-like optical element (4) formed with a ¼ wavelength plate portion (1) and a −¼ wavelength plate portion (2) alternately jointed together at a joint portion (3), and a second plate-like optical element (8) formed with a ¼ wavelength plate portion (5) and a −¼ wavelength plate portion (6) alternately jointed together at a joint portion (7), wherein the first plate-like optical element (4) and the second plate-like optical element (8) are parallel, and the ¼ wavelength plate portion (1) of the first plate-like optical element (4) and the −¼ wavelength plate portion (6) of the second plate-like optical element (8) are overlapped across a gap (9).

2 Claims, 13 Drawing Sheets

FOREIGN PATENT DOCUMENTS

| | | |
|---|---|---|
| EP | 1 224 502 B1 | 8/2004 |
| JP | 10335758 | 12/1998 |
| JP | 2005-106627 | 4/2005 |
| JP | 2006-323926 | 11/2006 |
| WO | 2004/008196 | 1/2004 |
| WO | 2005/029050 | 3/2005 |

OTHER PUBLICATIONS

International Preliminary Report on Patentability and Written Opinion of PCT/JP2006/326398 mailed Aug. 21, 2008.

* cited by examiner

OPTICAL MODULE AND IMAGING DEVICE

BACKGROUND OF THE INVENTION

1. Field of the Invention

The present invention relates to an optical module and an imaging device. In particular, the present invention relates to an optical module and an imaging device which effectively extract only light components located in predetermined positions, thereby obtaining a clearer image of an observation object.

2. Description of the Related Art

Imaging devices, such as a camera, can obtain a certain level of clear images by focusing on an observation object. However, when a conventional camera focuses on an observation object, the other objects are not focused sharply and blurred images of the other objects are obtained. So a clearer image of an observation object is demanded by cutting lights coming from the objects other than the observation object.

On the other hand, an image of an observation object shedding a glimmering light, such as a certain planet, is desired to be obtained as clear as possible. But intense lights surrounding the observation object prevent the image of the observation object from being taken. So if only predetermined light components which satisfy predetermined conditions can be extracted, light components which do not satisfy the predetermined conditions can be eliminated, thereby obtaining a clear image of an observation object shedding a glimmering light which satisfies predetermined conditions.

FIG. 16 of Japanese Patent Laid Open No. 2005-106627 discloses a two-ply diffraction grating which sensitively detects information on the gradient of every direction of an object. But it does not comprise optical elements for extracting light which satisfies certain conditions. Thus light components which satisfy certain conditions cannot be effectively extracted.

The object of the present invention is to provide an optical module which can extract light components satisfying certain conditions.

The object of the present invention is to provide an imaging device comprising the above described optical module.

SUMMARY OF THE INVENTION

The present invention basically comprises two optical elements having at least two kinds of portions: ¼ wavelength plate portion and −¼ wavelength plate portion, which differ in the characteristics of phase modulation of light penetrating through the portions. And the present invention focuses on the fact that light components having penetrated through the portions are modulated or light components whose phases once modulated return to the original phases, depending on the paths the light components transmit. The present invention is also based on the idea that when outputs of two optical elements are introduced to a polarizer, only light component which satisfies a certain condition can be controlled to penetrate through the two optical elements and be outputted from the polarizer.

The first aspect of the present invention relates to an optical module for controlling the phase of input light in accordance with predetermined conditions. FIG. 1(A) and FIG. 1 (B) are schematic diagrams showing an optical module of the present invention. FIG. 1(A) is a schematic diagram showing the optical module of the present invention. FIG. 1(B) is a top view of the optical module of the present invention. FIG. is an explanatory figure. As shown in FIG. 1(A), the optical module of the present invention basically comprises the following arrangement. That is an optical module (10) comprising: a first plate-like optical element (4) formed with a ¼ wavelength plate portion (1) and a −¼ wavelength plate portion (2). The ¼ wavelength plate portion (1) and the −¼ wavelength plate portion (2) alternately are jointed together at a joint portion (3); and a second plate-like optical element (8) formed with a ¼ wavelength plate portion (5) and a −¼ wavelength plate portion (6). The ¼ wavelength plate portion (5) and the −¼ wavelength plate portion (6) alternately are jointed together at a joint portion (7), wherein the first optical element (4) and the second optical element (8) are parallel, the ¼ wavelength plate portion (1) of the first optical element (4) and the −¼ wavelength plate portion (6) of the second optical element (8) are overlapped across a gap (9), and the −¼ wavelength plate portion (2) of the first optical element (4) and the ¼ wavelength plate portion (5) of the second optical element (8) are overlapped across the gap (9).

Since the ¼ wavelength plate portion and the −¼ wavelength plate portion shifts the phase of the lights which transmit therethrough by a predetermined amount, whether the phase of a light wave entering into the optical module is modulated or not depends on which part of the above described optical elements (4, 8) the light wave transmits. In this way, optical phase modulation can be performed in accordance with predetermined conditions. And when only light component satisfying a predetermined condition is controlled to have a predetermined polarization plane by the phase modulation, only light component satisfying a predetermined condition can be extracted by introducing the light wave which has transmitted through the optical module of the present invention into a polarizer.

The second aspect of the present invention relates to an imaging device which can effectively extract light components satisfying predetermined conditions. The imaging device basically comprises: a lens (21); an optical module (10), wherethrough light from the lens (21) transmits; a first polarizer (22) for adjusting the polarization plane of the light entering into the optical module (10); a second polarizer (23) for polarizing and separating the light being emitted from the optical module (10); and a photodetector (24) for detecting light emitted form the second polarizer (23), wherein the optical module (10) comprises: a first plate-like optical element (4) formed with a ¼ wavelength plate portion (1) and a −¼ wavelength plate portion (2), the ¼ wavelength plate portion (1) and the −¼ wavelength plate portion (2) alternately being jointed together at a joint portion (3); and a second plate-like optical element (8) formed with a ¼ wavelength plate portion (5) and a −¼ wavelength plate portion (6), the ¼ wavelength plate portion (5) and the −¼ wavelength plate portion (6) alternately being jointed together at a joint portion (7), wherein the first optical element (4) and the second optical element (8) are parallel, wherein the ¼ wavelength plate portion (1) of the first optical element (4) and the −¼ wavelength plate portion (6) of the second optical element (8) are overlapped across a gap (9), and wherein the −¼ wavelength plate portion (2) of the first optical element (4) and the ¼ wavelength plate portion (5) of the second optical element (8) are overlapped across the gap (9).

Namely, the first polarizer (22) adjusts the polarization plane of a light wave, and the optical module adjusts optical phase satisfying predetermined conditions, then the second polarizer (23) transmits only light components having a certain polarization plane which is modulated by the optical module. Thus the imaging device of the present invention can effectively extract light components which satisfy predetermined conditions.

The present invention can provide an optical module which can extract light components satisfying predetermined conditions by controlling the wavelength plate portion which transmits light waves. The present invention can further provide an imaging device which can extract only light components satisfying predetermined conditions (e.g., a condition that an observation object is located in a certain location.)

BRIEF DESCRIPTION OF THE DRAWINGS

FIG. 1(A) is a schematic diagram showing the optical module of the present invention. FIG. 1(B) is a top view of the optical module of the present invention.

FIG. 6(A) is a schematic diagram showing the optical module in accordance with the embodiment. FIG. 6(B) is a top view of the optical module.

In FIGS. 11(A) and 11(B), the vertical axis is represented by the value of the position of Z-axis divided by (D/2), the horizontal axis is represented by the value of the X-axis (x) divided by D tan θ. FIG. 11(A) is a graph (a contour drawing) showing coupling efficiency wherein the vertical axis and the horizontal axis are from −10 to 10 respectively. FIG. 11(B) is a graph (a partial enlarged view of FIG. 11(A)) showing coupling wherein the vertical axis and the horizontal axis are from −2 to 2 respectively.

Figure 1A:
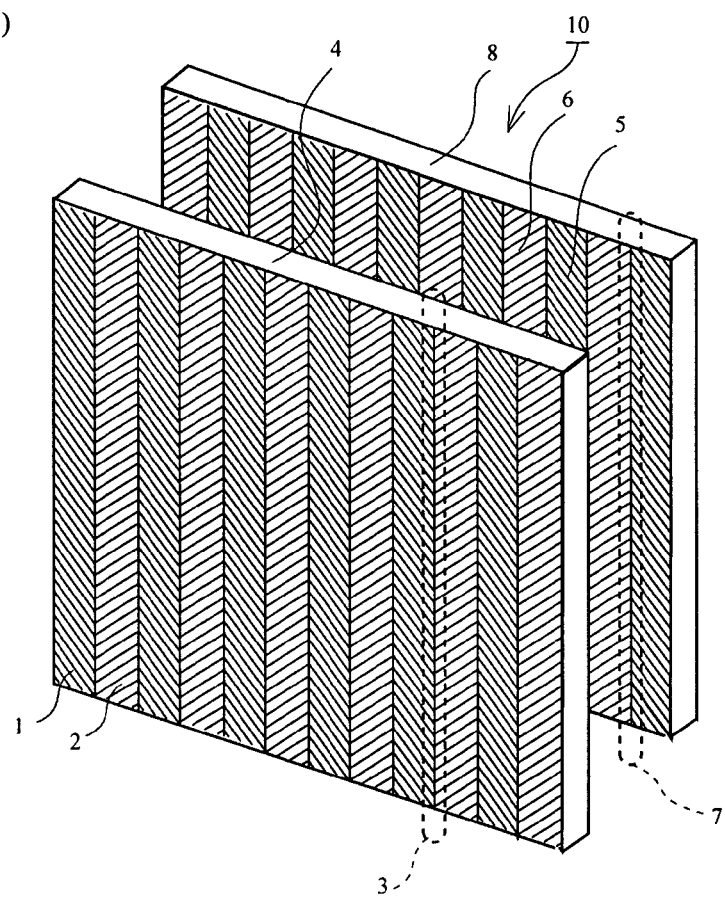
FIG. 1(A) and FIG. 1(B) are schematic diagrams showing an optical module of the present invention.

EXPLANATION OF ELEMENT NUMERALS 1 a ¼ wavelength plate portion
2 a −¼ wavelength plate portion
3 a joint portion
4 the first optical element
5 a ¼ wavelength plate portion
6 a −¼ wavelength plate portion
7 a joint portion
8 the second optical element
9 the gap
9 a the length of the gap/the width of the gap
10 the optical module
21 the first lens
22 the first polarizer
23 the second polarizer
24 a photo detector
25 the second lens
26 the light
27 the light
28 the light
29 the light
31 the light
32 the light
33 the focal point

DESCRIPTION OF THE PREFERRED EMBODIMENTS

Optical Module

Figure 1B:
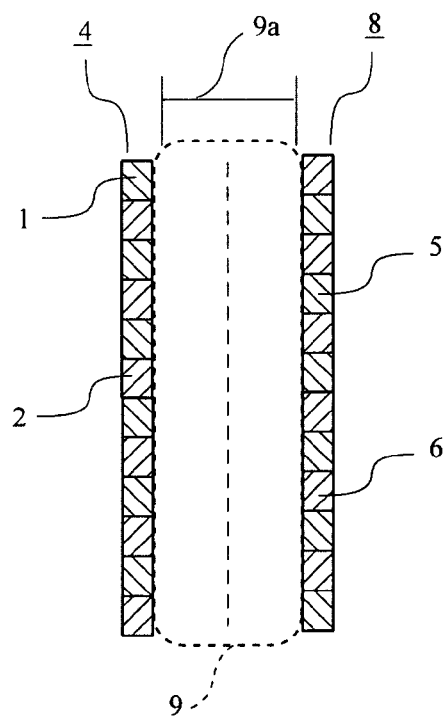

The first aspect of the present invention relates to an optical module for controlling the phase of input light in accordance with predetermined conditions. FIG. 1 is a schematic diagram showing an optical module of the present invention. FIG. 1(A) is a schematic diagram showing the optical module of the present invention. FIG. 1(B) is a top view of the optical module of the present invention. As shown in FIG. 1(A), the optical module (10) of the present invention basically comprises: a first plate-like optical element (4) formed with a ¼ wavelength plate portion (1) and a −¼ wavelength plate portion (2). The ¼ wavelength plate portion (1) and the −¼ wavelength plate portion (2) alternately are jointed together at a joint portion (3); and a second plate-like optical element (8) formed with a ¼ wavelength plate portion (5) and a −¼ wavelength plate portion (6). The ¼ wavelength plate portion (5) and the −¼ wavelength plate portion (6) alternately are jointed together at a joint portion (7), wherein the first optical element (4) and the second optical element (8) are parallel, the ¼ wavelength plate portion (1) of the first optical element (4) and the −¼ wavelength plate portion (6) of the second optical element (8) are overlapped across a gap (9), and the −¼ wavelength plate portion (2) of the first optical element (4) and the ¼ wavelength plate portion (5) of the second optical element (8) are overlapped across the gap (9).

The ¼ wavelength plate portion and the −¼ wavelength plate portion shifts the phase of lights which pass therethrough by a predetermined amount. So whether the phase of a light entering into the optical module is modulated or not depends on which part of the above described optical elements (4, 8) the light transmits. In this way, optical phase modulation can be performed in accordance with predetermined conditions. And when only light components satisfying a predetermined condition are controlled to have a predetermined polarization plane by the phase modulation, light components which satisfy a predetermined condition can be extracted by introducing the light components which transmitted through the optical module (10) of the present invention into a polarizer. Hereinafter, each component of the optical module of the resent invention is explained.

The optical module (10) of the present invention can be, for example, used for extraction of light, in which only light components whose focal points are in a predetermined position are outputted or not outputted as later described. Namely the optical module (10) of the present invention, for example, can be used as an optical filter for extracting light components which are located in a predetermined position.

"Optical element" is an element for adjusting optical phase, optical path and the like. Known materials of optical crystal or photonic crystal can be used as the materials of the first optical element (4) and the second optical element (8) of the present invention as appropriate. The shape of the first optical element (4) and the second optical element (8) of the present invention respectively, for example, is square (or rectangular). And it is preferred that these shapes be the same. The size of the first optical element (4) and the second optical element (8) is preferred to be adjusted in accordance with the performance of the optical elements required, the number of the wavelength plate portions, and the like as appropriate. A specific example of the dimensions of the optical elements (4, 8) is 1 mm$^2$ to 100 cm$^2$, preferably be 3 mm$^2$ to 10 cm$^2$, and preferably be 0.5 mm$^2$ to 5 cm$^2$ to mount the optical elements on a small optical equipment. When the optical module of the present invention is used for endoscopes, the dimension of the optical elements (4, 8) is 1 mm$^2$ to 10 cm$^2$, preferably is 3 mm$^2$ to 5 cm$^2$, and more preferably is 5 mm$^2$ to 2 cm$^2$. And a specific example of the thickness of the optical elements (4, 8) is 1 μm to 1 mm, preferably is 10 μm to 0.1 mm. And the width of the gap (9a) is, for example, $1\times10^{-2}$ cm to 1 cm, and it may be $5\times10^{-2}$ cm to $5\times10^{-1}$ cm.

The term "the ¼ wavelength plate portion" and "the −¼ wavelength plate portion" respectively means the portion which acts as a ¼ wavelength plate and a −¼ wavelength plate respectively. The respective function of the ¼ wavelength plate and the −¼ wavelength plate is known. Namely, the ¼ wavelength plate has the function of generating a phase difference of ¼ wavelength to incident light beam (slow light components delay in comparison with fast light components on the emitting surface of the wavelength plate). On the other hand, the −¼ wavelength plate has the function of generating a phase difference of −¼ wavelength to incident light beam. The ¼ wavelength plate portion and the −¼ wavelength plate portion may be arranged one by one, or multiple pieces (e.g., 2 to $1\times10^3$ pieces) of each ¼ wavelength plate portion and −¼ wavelength plate portion may be arranged alternately in a longitudinal or lateral direction. Also, "the ¼ wavelength plate portion" and "the −¼ wavelength plate portion" which is respectively striped (square shaped or preferably rectangular shaped) may be arranged alternately.

As above mentioned, the optical module (10) comprises a ¼ wavelength plate portion (1) and a −¼ wavelength plate portion (2) alternately jointed together at a joint portion (3). The ¼ wavelength plate portion (1) and the −¼ wavelength plate portion (2) may respectively be formed with one or a plurality of ¼ wavelength plates and −¼ wavelength plates arranged alternately, or may be formed with one or a plurality of ¼ wavelength plates and −¼ wavelength plates merged together. They may further be crystal such as photonic crystal which have ¼ wavelength plate portion (1) and −¼ wavelength plate portion (2). Note that a preferred embodiment of the optical module of the present invention comprises the first optical element (4) and the second optical element (8) wherein the elements are composed of photonic crystal. Uniform optical elements (4, 8) including the ¼ plate portion (1), the −¼ plate portion (2), and the joint portion (3) can be composed of photonic crystal, which makes handling thereof quite easy.

A preferred embodiment of the optical module of the present invention, as shown in FIG. 1(A), is the above mentioned optical module, wherein the first optical element (4) comprises one or a plurality of the ¼ wavelength plate portions (1) and one or a plurality of the −¼ wavelength plate portions (2), and wherein the ¼ wavelength plate portion (1) and the −¼ wavelength plate portion (2) of the first optical element (4) are striped and respectively have the same width, and wherein the second optical element (8) comprises one or a plurality of the ¼ wavelength plate portions (5) and one or a plurality of the −¼ wavelength plate portions (6), and wherein the ¼ wavelength plate portion (5) and the −¼ wavelength plate portion (6) of the second optical element (8) are striped and respectively have the same width.

The optical module (10) according to the above described embodiment is preferably provided with a plurality of the ¼ wavelength plate portions (5) and the −¼ wavelength plate portions (6). The specific number of the portions is respectively 2 to $1\times10^3$, and preferably is 5 to $1\times10^2$. In this way, the optical module of the present invention extend its controllable area by having a plurality of the ¼ wavelength plate portions (5) and the −¼ wavelength plate portions (6). In particular, the controllable area of the optical module of the present invention extends in the direction where the pluralities of wavelength plates are arranged.

A preferred embodiment of the optical module of the present invention is the above described optical module wherein the length of the gap (9a) between the first optical element (4) and the second optical element (8) is $1\times10^{-2}$ cm to 1 cm.

A polarizer is an element basically for transmitting light of a predetermined transmission axis direction. As the polarizer, a publicly known polarizer (including a polarization beam splitter and the like) can be used as appropriate. Also, as the optical module of the present invention, publicly known components used for publicly known optical equipment can be adopted as appropriate.

Operation and Use Example of the Optical Module

Figure 2:
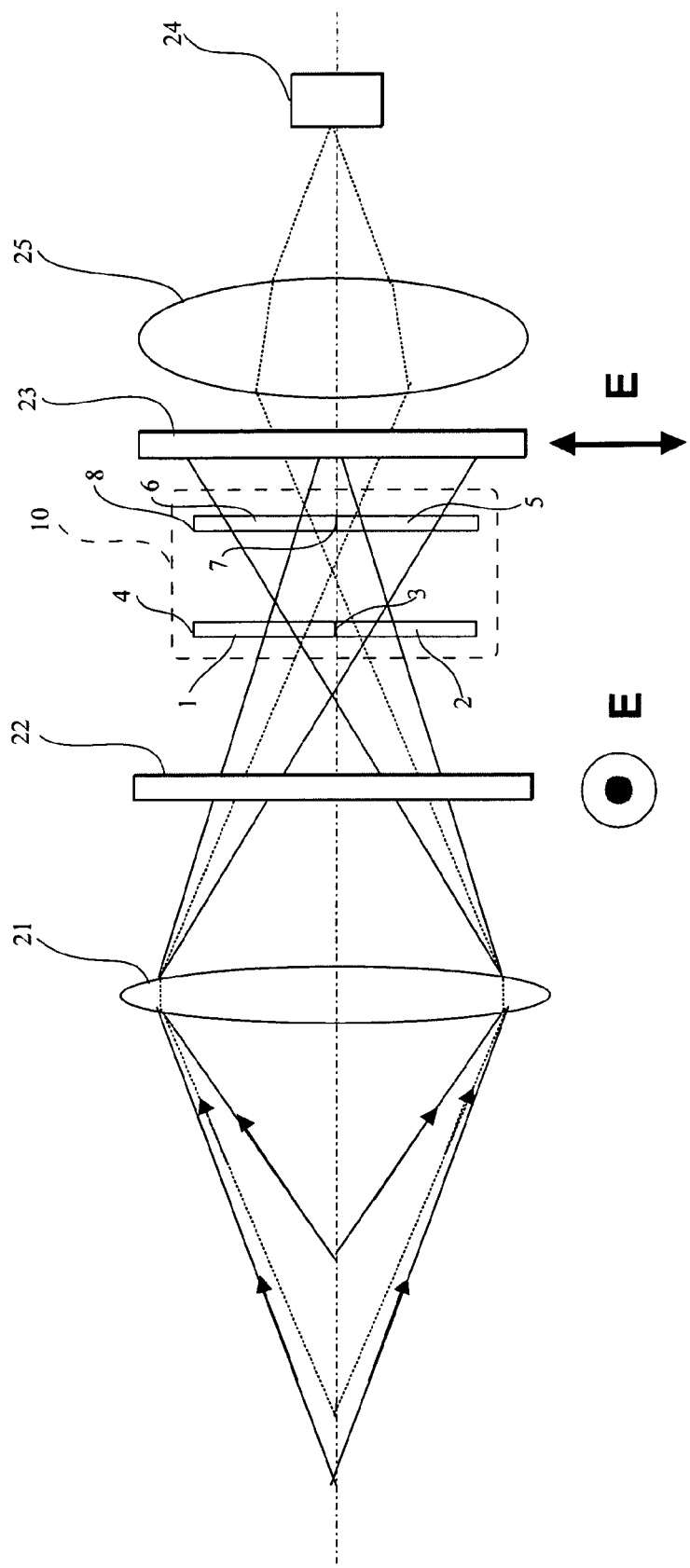
FIG. 2 is a diagram explaining the operation of an optical module of the present invention.

Hereinafter, the operation and use example of the optical module of the present invention is explained. FIG. 2 is a diagram explaining the operation of the optical module of the present invention. As shown in FIG. 2, the optical device including this optical module (in particular, an imaging device described below and the like) comprises: a lens (21) where light from an observation object enters; a first polarizer (22) where the light from the lens (21) enters; an optical module (10) where the light from the first polarizer (22) enters; the second polarizer (23) where the light from the optical module (10) enters; and a photodetector (24) where the light from the second polarizer (23) enters. The reference number 25 of FIG. 2 represents any lens. And E of FIG. 2 is an example of a polarization plane of the polarizer. Note that the location of the lens (21) and the first polarizer (22) shown in FIG. 2 may be reversed. The first optical element (4) and the second optical element (8) of the optical module (10), shown in FIG. 2, respectively has a pair of the ¼ wavelength plate portion and the −¼ wavelength plate portion. However the first optical element (4) and the second optical element (8) of the optical module (10), shown in FIG. 1, respectively has a plurality of the ¼ wavelength plate portions and the −¼ wavelength plate portions. This is true to the following diagrams. As the photodetector (24) an image sensor such as a CCD can be used.

In this example, light which have transmitted through the first lens (21) and the first polarizer (22) transmits the first optical element (4) and the second optical element (8). And a part of the light which has transmitted through the second optical element (8) is polarized and separated by the second polarizer (23). The light having transmitted through the second polarizer (23) is condensed by the second lens (25), and then detected by the photodetector (24).

Figure 3:
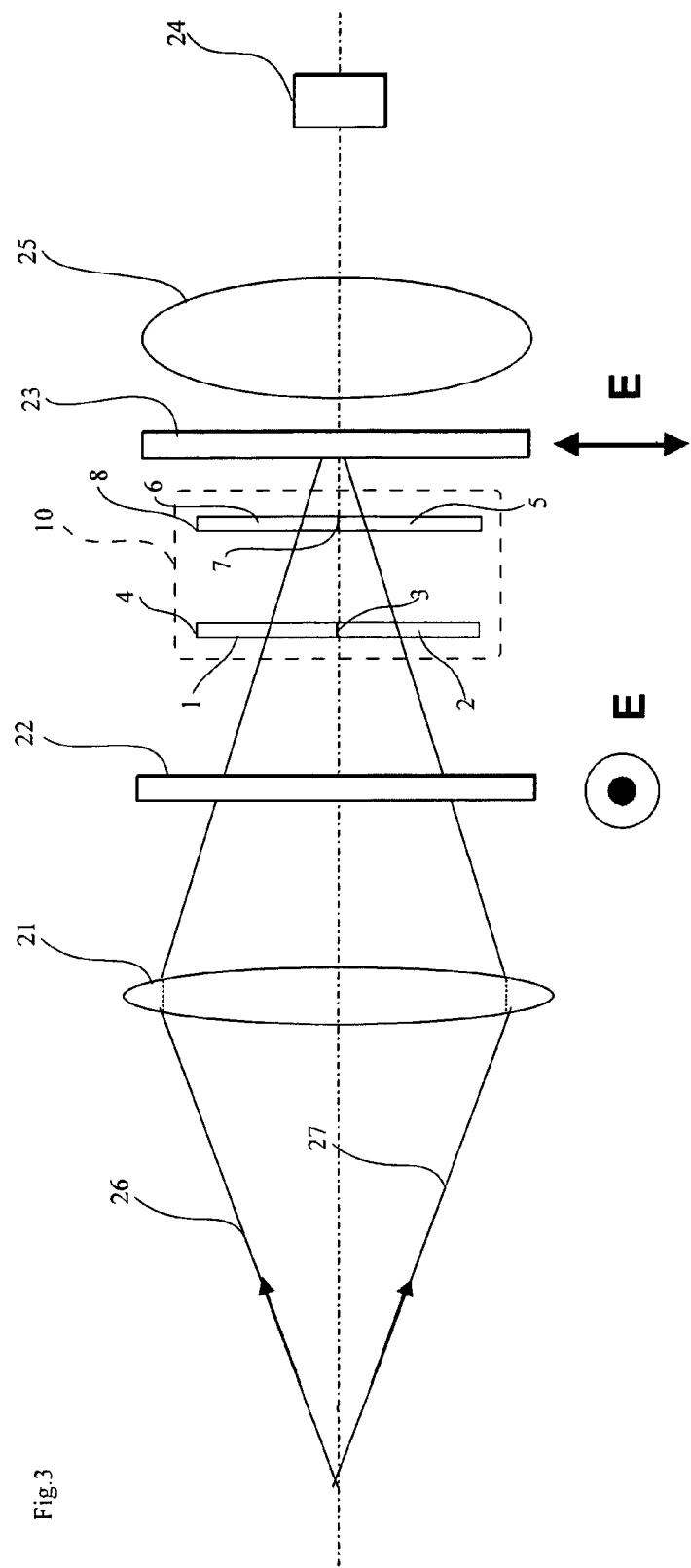
FIG. 3 is a diagram for explaining the movement of light whose focal point is in the gap between the second optical element and the second lens, not in the gap between the first optical element and the second optical element.

FIG. 3 is a diagram for explaining the movement of light whose focal point is in the gap between the second optical element and the second lens, not in the gap between the first optical element and the second optical element. In FIG. 3, the polarization plane of the light which has transmitted through the first polarizer (22) is adjusted. The adjusted polarization plane is, for example, shifted by π/2 to the polarization plane that can transmit the second polarizer (23).

When the light (26) enters into the first lens (21) and transmits through the first optical element (4), the phase of the light (26) shifts because the light (26) transmits through the ¼ wavelength plate portion (1). On the other hand, when the light (26) transmits through the second optical element (8), since the light (26) transmits through the −¼ wavelength plate portion (6), the phase of the light (26) which have been shifted by the ¼ wavelength plate portion returns to the original phase. So the light (26) cannot transmit through the second polarizer (23). The same is true to the light (27). Namely, as shown in FIG. 3, when the focal point of the light is not in the gap between the first optical element (4) and the second optical element (8), but behind the second optical element (8), the light outputted from the second polarizer (8) cannot penetrate through the second polarizer (23). In this case, the light cannot be detected by the photodetector (24).

Figure 4:
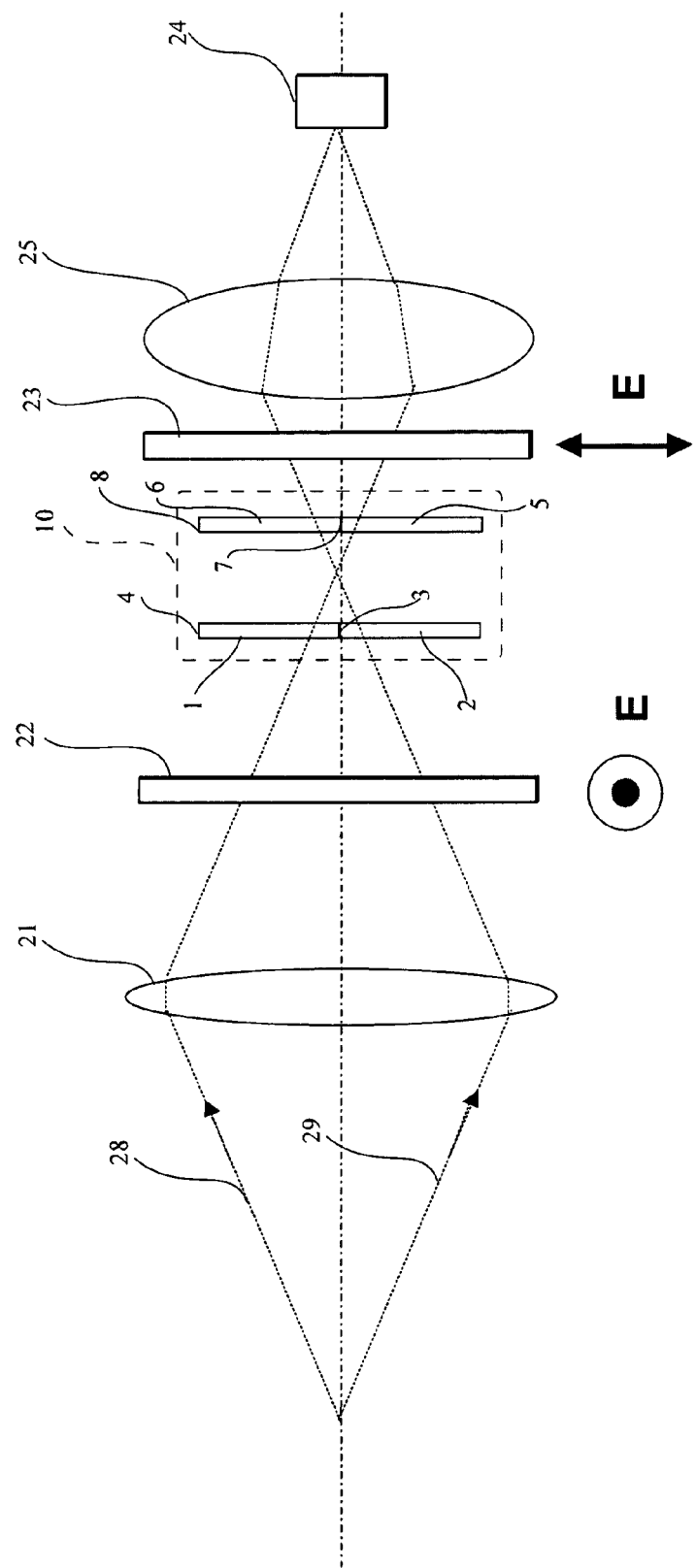
FIG. 4 is a diagram for explaining the movement of light whose focal point is in the gap between the first optical element and the second optical element.

FIG. 4 is a diagram for explaining the movement of light whose focal point is in the gap between the first optical element and the second optical element. In FIG. 4, the polarization plane of the light which has passed through the first polarizer (22) is adjusted. For example, the polarization plane is shifted by π/2 with respect to the polarization plane which can transmit through the second polarizer (23).

When the light (28) enters into the first lens (21) and transmits through the first optical element (4), the phase of the light (28) shifts because the light (28) transmits through the ¼ wavelength plate portion (1). Furthermore, when the light (28) transmits through the second optical element (8), since the light (28) transmits through the ¼ wavelength plate portion (5), the phase of the light (28) is shifted by the same amount that has been shifted by the ¼ wavelength plate portion (1). So the light (28) can transmit through the second polarizer (23). The same is true to the light (29). Namely, the light whose focal point is in between the first optical element (4) and the second optical element (8) can be outputted from the second polarizer (23). And the light outputted from the second polarizer (23) can be detected by the photodetector (24) through the second lens (25).

Figure 5:
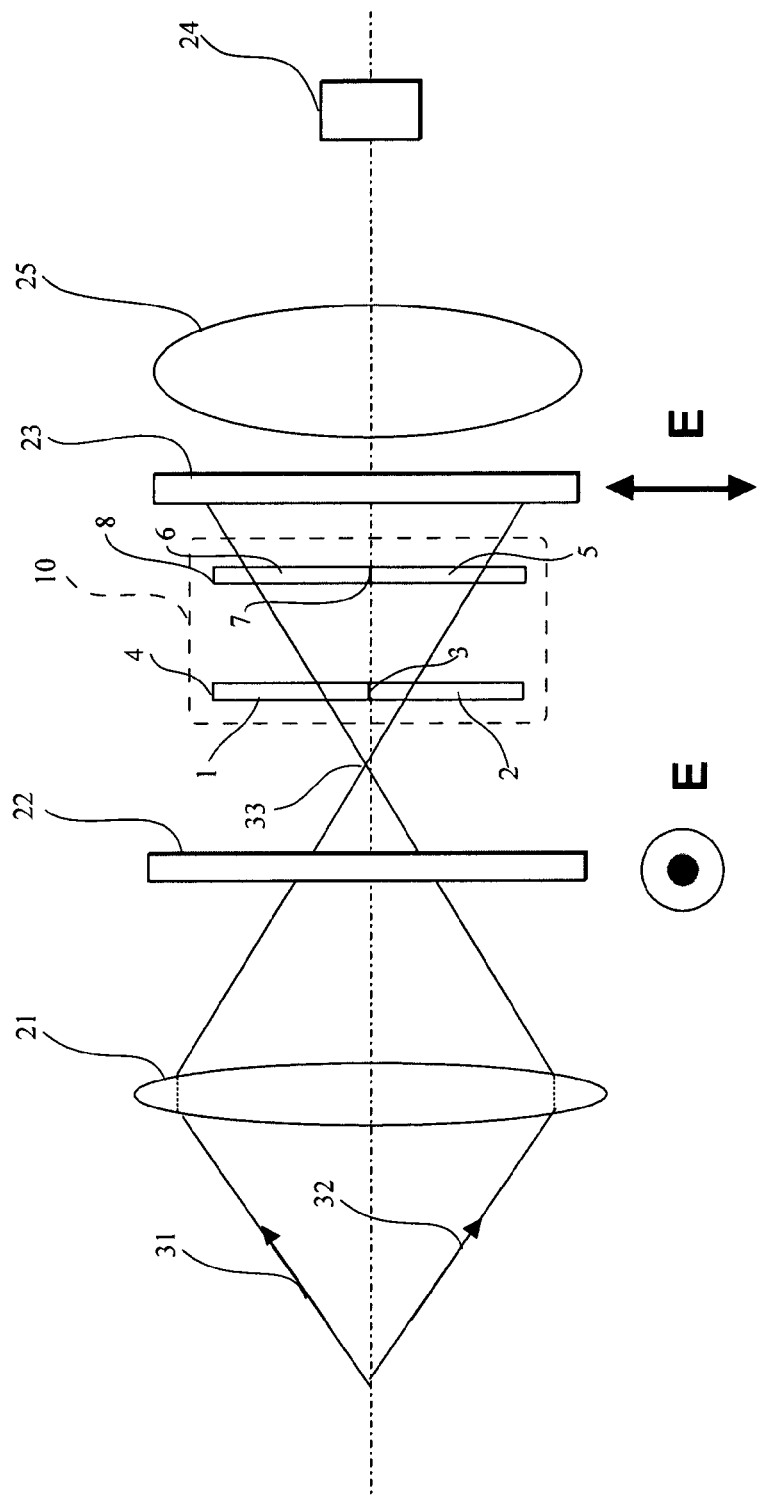
FIG. 5 is a diagram for explaining the movement of light whose focal point is in the gap between the first lens and the first optical element, not in the gap between the first optical element and the second optical element.

FIG. 5 is a diagram for explaining the movement of light whose focal point is in front of the first optical element, not in the gap between the first optical element and the second optical element. In FIG. 5, the polarization plane of the light which enters into the first lens (21) is adjusted by the first polarizer (22). For example, the polarization plane is shifted by λ/2 with respect to the polarization plane which can transmit through the second polarizer (23).

When the light (31) enters into the first lens (21) and transmits through the first optical element (4), the phase of the light (31) shifts by a predetermined amount because the light (31) transmits through the −¼ wavelength plate portion (2). On the other hand, when the light (31) transmits through the second optical element (8), since the light (31) transmits through the ¼ wavelength plate portion (5), the phase of the light (31) which have been shifted by the −¼ wavelength plate portion (2) returns to the original phase. So the light (31) cannot transmit through the second polarizer (23). The same is true to the light (32). Namely, when the light focal point is in front of the first optical element (4), the light is not outputted from the second polarizer (23). In this case, the light cannot be detected by the photodetector (24).

As can be seen from the above description, when the optical device shown in FIG. 2 is used, the light whose focal point is in a predetermined position (for example between the joint portion (3) of the first optical element (4) and the joint portion (7) of the second optical element (8)) transmits through the second polarizer (23), but the other lights do not transmit through the second polarizer (23). This means that the optical device can extract only light components whose focal points are located in a predetermined position. So the optical module of the present invention can preferably be used for an optical device which extracts only light components which satisfy predetermined conditions. In particular, when the focal point of light from an observation object is adjusted so as to be located in between the two joint portions (3, 7), lights from objects other than the observation object can be cut, thereby the observation object can be observed effectively. Note that the focal point of light can be controlled, for example, by adjusting the distance between the lens (21) and the optical module (10) while keeping the optical axis of the lens (21) from positional deviation.

Modification and the Operation

The optical module so far explained comprises: a first plate-like optical element (4) formed with a ¼ wavelength plate portion (1) and a −¼ wavelength plate portion (2); and a second plate-like optical element (8) formed with a ¼ wavelength plate portion (5) and a −¼ wavelength plate portion (6), wherein the ¼ wavelength plate portion (1) of the first optical element (4) and the −¼ wavelength plate portion (6) of the second optical element (8) are overlapped across a gap (9), and wherein the −¼ wavelength plate portion (2) of the first optical element (4) and the ¼ wavelength plate portion (5) of the second optical element (8) are overlapped across the gap (9). However in the above configuration, the ¼ wavelength plate portion (1) of the first optical element (4) and the ¼ wavelength plate portion (5) of the second optical element (8) may be overlapped across a gap (9), and the −¼ wavelength plate portion (2) of the first optical element (4) and the −¼ wavelength plate portion (6) of the second optical element (8) may be overlapped across the gap (9).

Figure 6A:
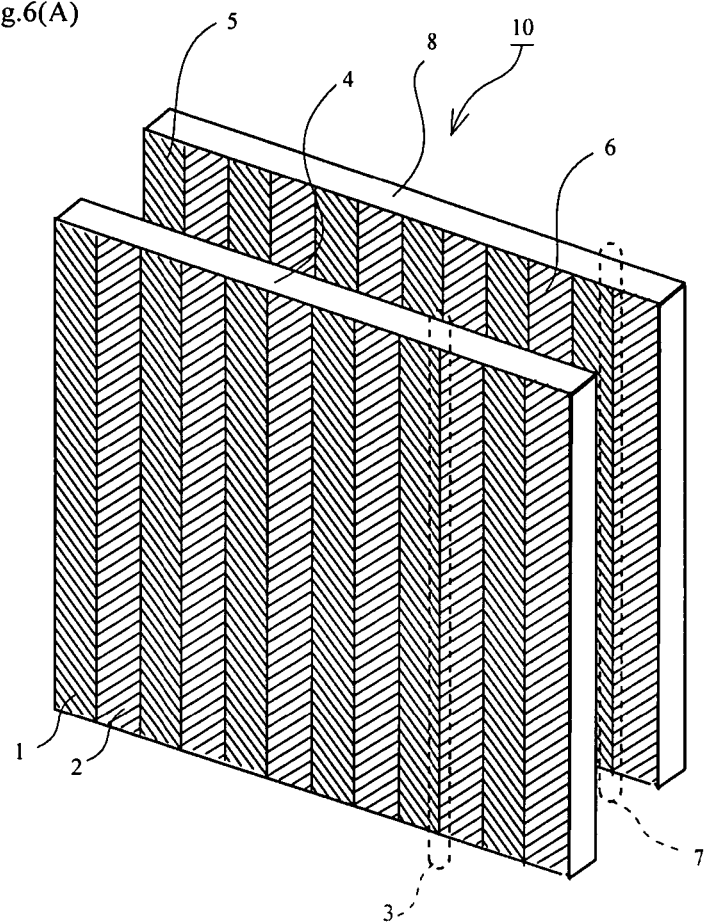
FIG. 6(A) and FIG. 6(B) are schematic diagrams showing an optical module in accordance with a certain embodiment.
Figure 6B:
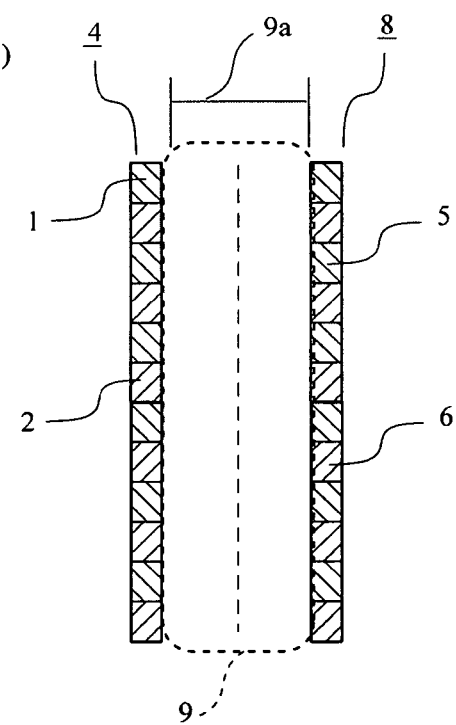

FIGS. 6(A) and 6(B) are schematic diagram showing an optical module in accordance with a certain embodiment. FIG. 6(A) is a schematic diagram showing the optical module in accordance with the embodiment. FIG. 6(B) is a top view of the optical module. As shown in FIG. 6, the optical module in accordance with this embodiment comprises: a first plate-like optical element (4) formed with a ¼ wavelength plate portion (1) and a −¼ wavelength plate portion (2), the ¼ wavelength plate portion (1) and the −¼ wavelength plate portion (2) alternately being jointed together at a joint portion (3); and a second plate-like optical element (8) formed with a ¼ wavelength plate portion (5) and a −¼ wavelength plate portion (6), the ¼ wavelength plate portion (5) and the −¼ wavelength plate portion (6) alternately being jointed together at a joint portion (7), wherein the first optical element (4) and the second optical element (8) are parallel, and the ¼ wavelength plate portion (1) of the first optical element (4) and the ¼ wavelength plate portion (5) of the second optical element (8) are overlapped across a gap (9), and the −¼ wavelength plate portion (2) of the first optical element (4) and the −¼ wavelength plate portion (6) of the second optical element (8) are overlapped across the gap (9).

Figure 7:
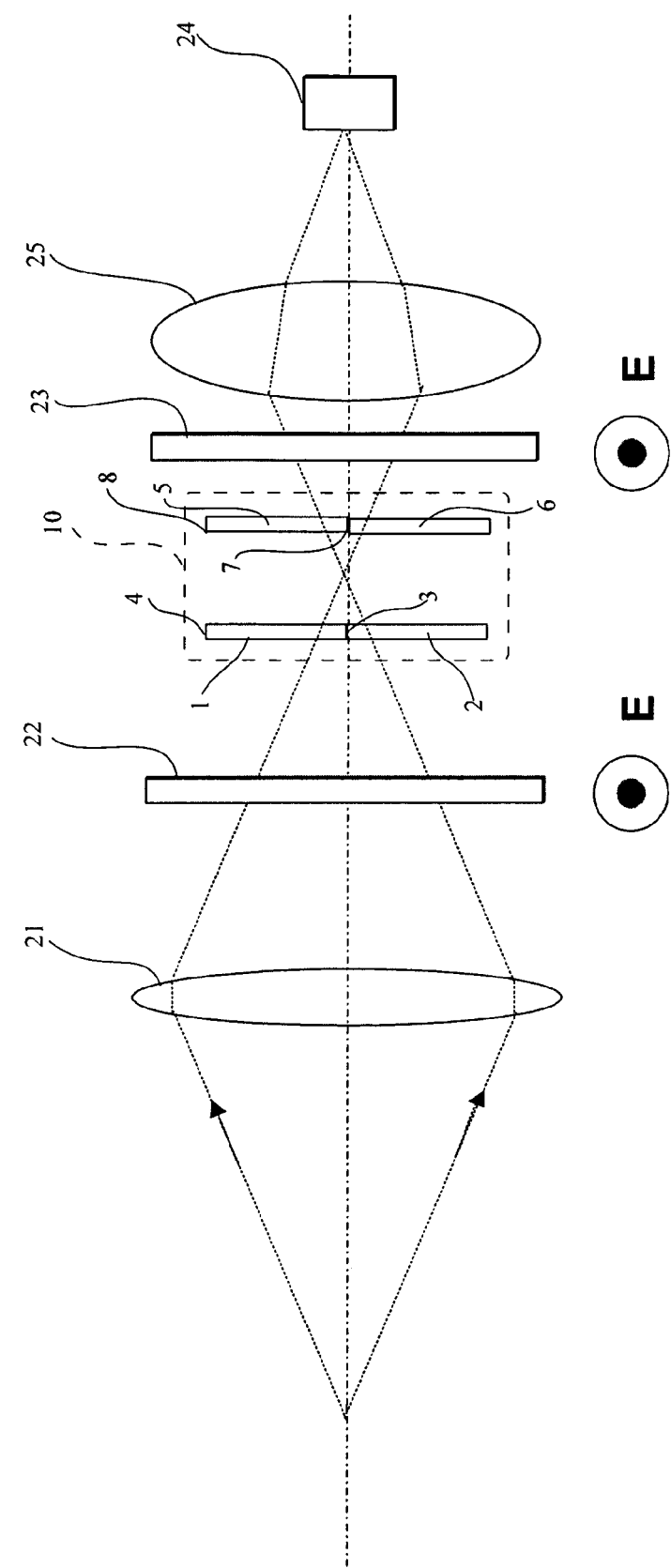
FIG. 7 is a diagram for explaining an example of an optical device having an optical module in accordance with a certain embodiment.

FIG. 7 is a diagram for explaining an example of the optical device having an optical module in accordance with a certain embodiment. In this optical device, the ¼ wavelength plate portion (1) of the first optical element (4) and the ¼ wavelength plate portion (5) of the second optical element (8) are overlapped across a gap (9), and the −¼ wavelength plate portion (2) of the first optical element (4) and the −¼ wavelength plate portion (6) of the second optical element (8) are overlapped across the gap (9). Namely, this optical device is an optical module which comprises: a lens (21); an optical module (10), wherethrough light from the lens (21) transmits; a first polarizer (22) for adjusting the polarization plane of the light, the light incident into the optical module (10); and a second polarizer (23) for polarizing and separating the light, the light being outputted from the second polarizer (23), wherein the optical module (10) comprises: a first plate-like optical element (4) formed with a ¼ wavelength plate portion (1) and a −¼ wavelength plate portion (2), the ¼ wavelength plate portion (1) and the −¼ wavelength plate portion (2) alternately being jointed together at a joint portion (3); and a second plate-like optical element (8) formed with a ¼ wavelength plate portion (5) and a −¼ wavelength plate portion (6), the ¼ wavelength plate portion (5) and the −¼ wavelength plate portion (6) alternately being jointed together at a joint portion (7); wherein the first optical element (4) and the second optical element (8) are parallel, wherein the ¼ wavelength plate portion (1) of the first optical element (4) and the ¼ wavelength plate portion (5) of the second optical element (8) are overlapped across a gap (9), and wherein the −¼ wavelength plate portion (2) of the first optical element (4) and the −¼ wavelength plate portion (6) of the second optical element (8) are overlapped across the gap (9). This optical device, as described later, can extract light components which satisfy predetermined conditions. So the optical device, for example, acts as an imaging device.

It is preferred that the first optical polarizer (22) and the second optical polarizer (23) of this optical device be aligned so that they are perpendicular to the plane of the figure. In this way, only light components which satisfy predetermined conditions can be extracted based on the principle so far explained. In this case, in particular, the phase of the polarization plane of light whose focal point is in between the first optical element and the second optical element returns to the original phase when the light transmits through the first optical element and the second optical element. Also the phase of the polarization plane of light whose focal point is in front of the first optical element or behind the second optical element is shifted by π/2. So when the polarized light transmission axis of the second polarizer is aligned with that of the first polarizer, light components which satisfy predetermined conditions can be extracted in the same way as the optical device explained above.

Another embodiment of the optical module of the present invention comprises a ½ wavelength plate portion (or a −½ wavelength plate portion) and a flat portion (portion which does not modulate phase of light) in place of the ¼ wavelength plate portion and the −¼ wavelength plate portion. In the optical module according to this embodiment, for example, ½ wavelength plate portions are used in place of the ¼ wavelength plate portions (1, 5) shown in FIG. 1 or FIG. 7, and flat portions are used in place of the −¼ wavelength plate portions (2, 6). For example, when the ¼ wavelength plate portions (1, 5) shown in FIG. 1 are replaced with ½ wavelength plate portions and the −¼ wavelength plate portions (2, 6) shown in FIG. 1 are replaced with flat portions, the polarization plane of the first polarizer (22) and that of the second polarizer (23) are aligned to be perpendicular to the plane of the figure. In this way, only light components which satisfy predetermined conditions can be extracted based on the principle so far explained. In this case, in particular, the phase of the polarization plane of light whose focal point is in between the first optical element and the second optical element returns to the original phase when the light transmits through the first optical element and the second optical element. Also the phase of the polarization plane of light whose focal point is in front of the first optical element or behind the second optical element is shifted by π/2. So when the polarized light transmission axis of the second polarizer is aligned with that of the first polarizer, light components which satisfy predetermined conditions can be extracted in the same way as the optical device explained above.

So far, the operation of the optical device comprising the first optical element (4) and the second optical element (8), both of which have a pair of a ¼ wavelength plate portion and a −¼ wavelength plate portion, was explained. When the first optical element (4) and the second optical element (8) are respectively composed of a plurality of ¼ wavelength plate portions and a plurality of −¼ wavelength plate portions, the observable range can be two-dimensionally extended. And when a movable device which can move the first lens (21) either closer or farther away from each optical element is used, the focal point of light entering into the first lens (21) can be adjusted as appropriate, thereby the distance from the optical device and an observable object can be adjusted as needed. And when a movable device which can move the optical module (10) or the photodetector (24) in the direction parallel to the optical axis, an observable range can be two-dimensionally enlarged.

When the ¼ wavelength plate portions (1, 5) shown in FIG. 7 are replaced with ½ wavelength plate portions and the −¼ wavelength plate portions (2, 6) shown in FIG. 7 are replaced with flat portions, the polarization plane of the first polarizer (22) and that of the second polarizer (23) are aligned to be perpendicular to the plane of the figure. In this case, in particular, the phase of the polarization plane of light whose focal point is in between the first optical element and the second optical element shifts π/2 when the light transmits through the first optical element and the second optical element. On the other hand, the phase of the polarization plane of light whose focal point is in front of the first optical element or behind the second optical element returns to the original phase. So when the polarized light transmission axis of the second polarizer is arranged perpendicular to that of the first polarizer, light components which satisfy predetermined conditions can be extracted in the same way as the optical device explained above.

Although, in the above explanation the first optical element and the second optical element are formed with wavelength plate portions, the wavelength plate portions may be replaced with optical rotatory element portions rotating the azimuth of the polarization plane of light. For example, it is preferred that the ¼ wavelength plate portions of each optical module so far explained be replaced with +45 degree optical rotatory element portions, and the −¼ wavelength plate portions be replaced with −45 degree optical rotatory element portions. It is also preferred that each optical rotatory element portion be formed on a transparent substrate by forming an oriented film such as a polyimide film on the surface of the transparent substrate and controlling the orientation direction of the oriented film as needed. Each optical rotatory element portion may also be formed with Faraday element which rotates the polarization of light transmitting therethrough by being applied a magnetic field.

It is also preferred that the ¼ wavelength plate portions (1, 5) of the optical module shown in FIG. 1 be replaced with +45 degree optical rotatory element portions and the −¼ wavelength plate portions (2, 6) of the optical module shown in FIG. 1 be replaced with −45 degree optical rotatory element portions. In this case, the azimuth of the polarization plane of light whose focal point is in between the first optical element and the second optical element is shifted by 90 degree when the light transmits through the first optical element and the second optical element. Also, the azimuth of the polarization plane of light whose focal point is in front of the first optical element or behind the second optical element returns to the original angle. So when the polarized light transmission axis of the second polarizer is arranged perpendicular to that of the first polarizer, light components which satisfy predetermined conditions can be extracted in the same way as the optical device explained above.

It is also preferred that the ¼ wavelength plate portions (1, 5) of the optical module shown in FIG. 7 be replaced with +45 degree optical rotatory element portions and the −¼ wavelength plate portions (2, 6) of the optical module shown in FIG. 7 be replaced with −45 degree optical rotatory element portions. In this case, the azimuth of the polarization plane of light whose focal point is in between the first optical element and the second optical element returns to the original angle when the light transmits through the first optical element and the second optical element. Also, the azimuth of the polarization plane of light whose focal point is in front of the first optical element or behind the second optical element is shifted by 90 degree. So when the polarized light transmission axis of the second polarizer is aligned with that of the first polarizer, light components which satisfy predetermined conditions can be extracted in the same way as the optical device explained above.

Mathematical Analysis

Hereinafter, mathematical analysis is made on the effect of incident light entering into the optical module (10) wherein the first optical element (4) and the second optical element (8) respectively has a plurality of wavelength plate portions as shown in FIG. 1. Based on the mathematical analysis, explanation will be made on the fact that planar image patterns can be obtained effectively by the optical module (10) having a plurality of the wavelength plate portions. The following analysis is made on the intensity of light which transmits through two pieces of parallel slits (rectangular formed) (i.e., coupling efficiency). Also in the following, the light transmitting through the first polarizer (22) and a joint portion between a ¼ wavelength plate portion and a −¼ wavelength plate portion is approximated by the light having transmitted through a slit.

Figure 8:
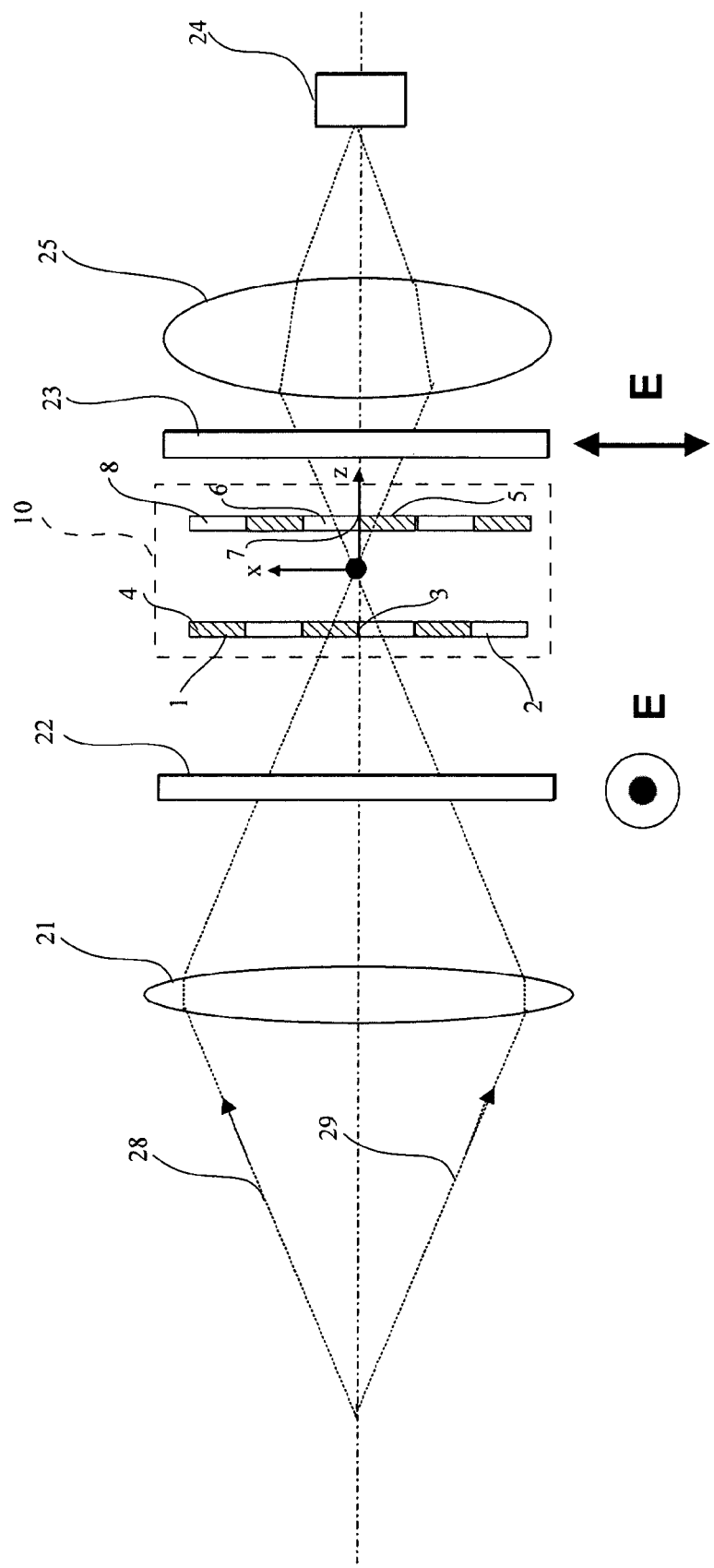
FIG. 8 is a diagram showing an example of an optical device for explaining mathematical analysis.

FIG. 8 is a diagram showing an example of the optical device for explaining mathematical analysis. In the diagram, the center of the two optical elements (4, 8) is selected as the coordinate origin, the direction where the ¼ wavelength plate portion (1) and the −¼ wavelength plate portion (2) are alternately jointed at the joint portion (3) (i.e., the direction parallel to the surface of paper, and parallel to the optical elements) is assumed to be the X-axis, the direction perpendicular to the plane of the figure is assumed to be the Y-axis, and the traveling direction of light transmitting the center of the lens (21) and the joint portion (3) is assumed to be the Z-axis.

Figure 9:
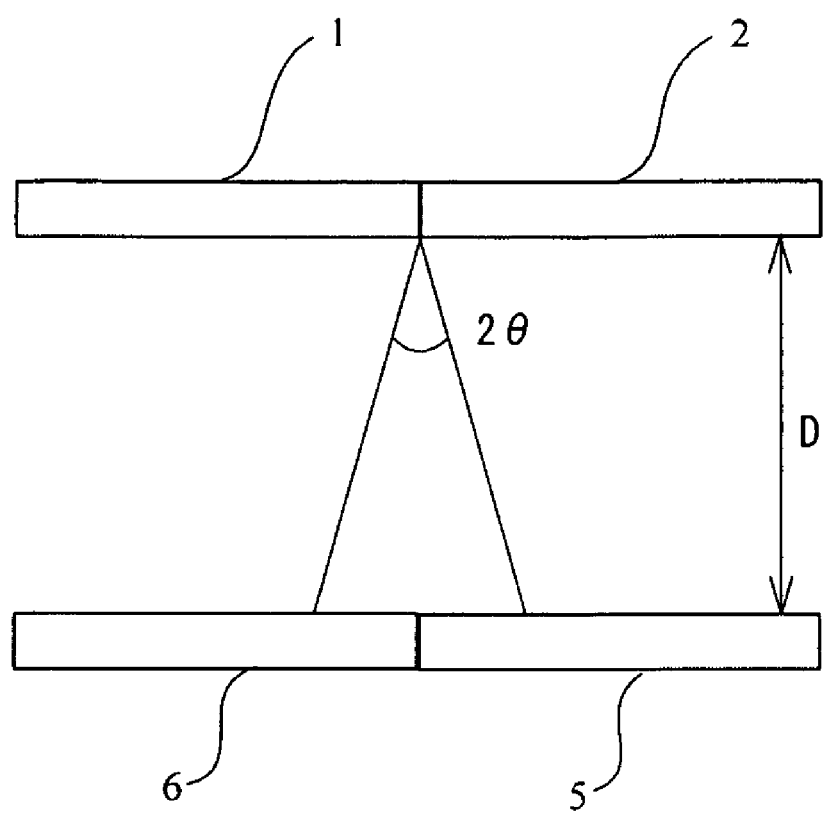
FIG. 9 is a diagram for explaining parameters for analysis system.
Figure 10:
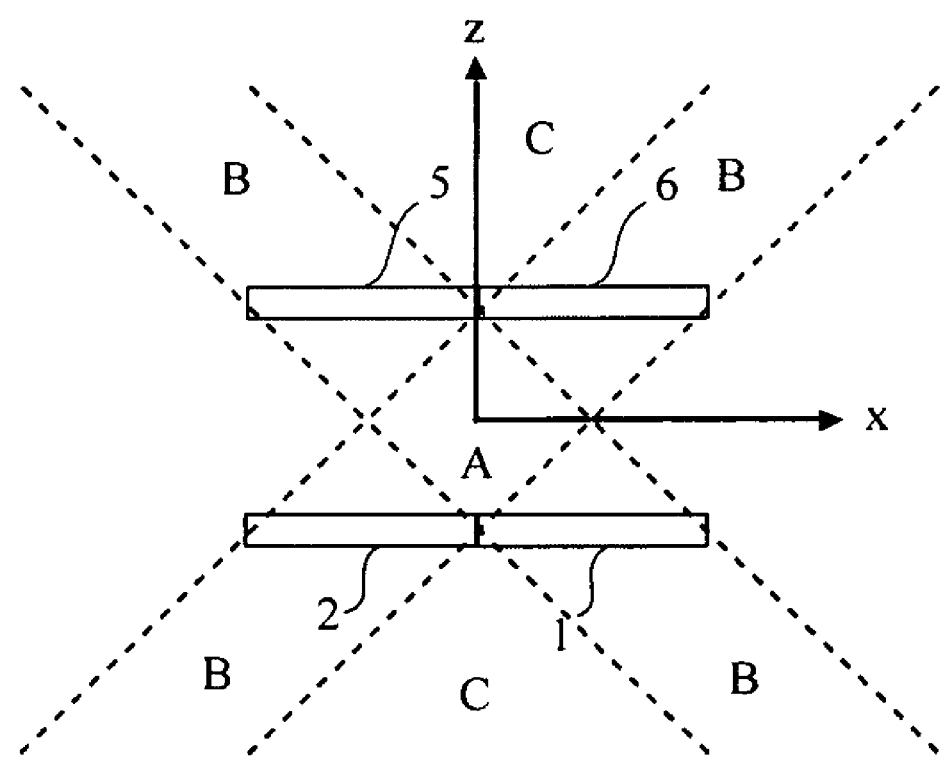
FIG. 10 is a diagram for spatially grouping focal positions of lights.

In the beginning, analysis is made on each optical element (4, 8) having a pair of the ¼ wavelength plate portion (1) and the −¼ wavelength plate portion (2). FIG. 9 is a diagram explaining parameters for an analysis system. As shown in FIG. 9, the gap (9a) between the two optical elements is represented by D, and the range of light emitted from the slit is represented by 2θ. FIG. 10 is a diagram spatially grouping focal positions of lights.

When the focal point is located in the area A of FIG. 10, and when optical coupling efficiency (i.e., the value related to light extraction efficiency which is related to light intensity) is represented by η, then the following formula is obtained: $\eta = 1 - 2|x|/[(D \tan \theta)\{1-(2Z/D)^2\}]$. On the other hand, when the focal point is in the area B of FIG. 10, the following formula is obtained: $\eta = \frac{1}{2}[1-2|x|/\{D \tan \theta (1+2|Z|/D)\}] = \frac{1}{2}\{1-2|x|/(D \tan \theta + 2 \tan \theta |z|)\}$. Furthermore, when the focal point is located in the area C of FIG. 10, the following formula is obtained: $\eta = 2|x|/[D \tan \theta \{(2Z/D)^2 - 1\}]$.

Figure 11A:
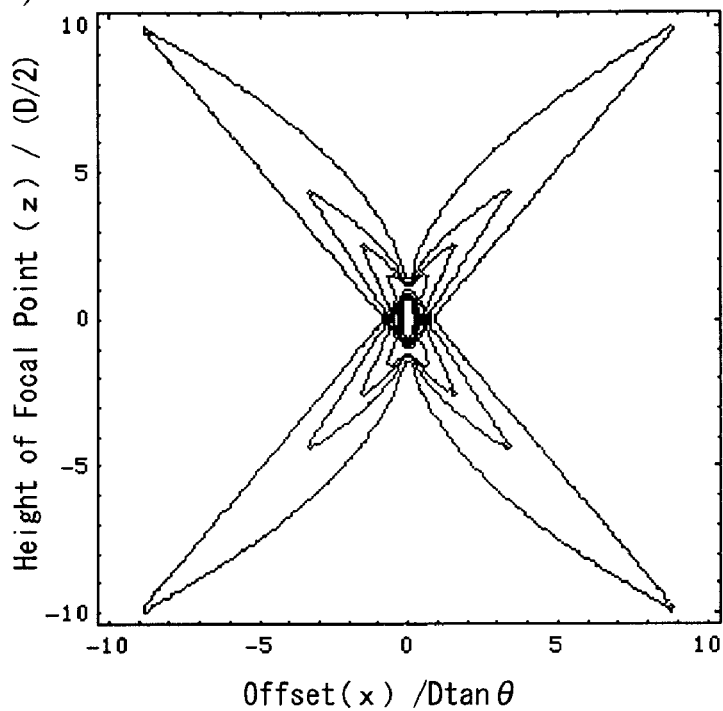
FIG. 11(A) and FIG. 11(B) are graphs showing coupling efficiency when the optical element has one slit.
Figure 11B:
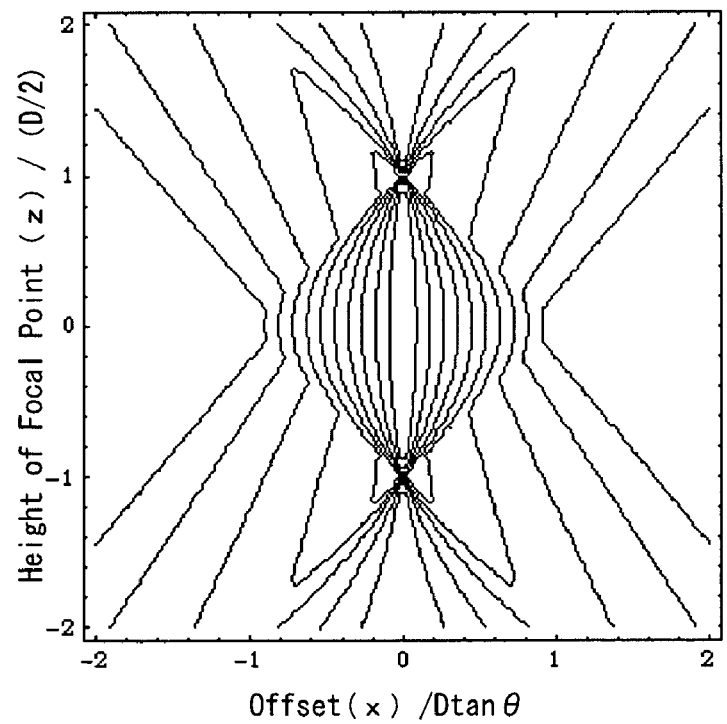

FIGS. 11(A) and 11(B) are graphs showing coupling efficiency when the optical element has one slit. In FIGS. 11(A) and 11(B), the vertical axis is represented by the value of the position of Z-axis divided by (D/2), the horizontal axis is represented by the value of the X-axis divided by D tan θ. FIG. 11(A) is a graph (a contour drawing) showing coupling efficiency wherein the vertical axis and the horizontal axis are from −10 to 10 respectively. FIG. 11(B) is a graph (a partial enlarged view of FIG. 11(A)) showing coupling efficiency wherein the vertical axis and the horizontal axis are from −2 to 2 respectively.

When the light from the source of the photographing system which is reflected by the observation object focuses in each area of FIG. 10 through lens (21), it can be seen from FIGS. 11(A) and 11(B) that high coupling efficiency is achieved in the area which is located between the joint portions of the two optical elements such as the area A of FIG. 10. It can also be seen that the coupling efficiency is maximized on the axis connecting the joint portions of the two optical elements (4, 8). On the other hand, lights focusing on the other areas have low coupling efficiency, thereby almost being deleted. It can be seen from the above analysis that the optical module of the present invention has strong selectivity in the Z-axis direction. On the other hand, it can be seen that the area in which the coupling efficiency increases is limited in the X-axis direction. Namely, the area which has a certain range of coupling efficiency is restricted to the area represented by D tan θ (i.e., horizontal axis: −1 to 1). On the other hand, the above mentioned selectivity is not observed in the Y-axis direction. So it can be considered that phace information can be obtained by arranging a number of slits in the X-axis direction (i.e., arranging a plurality of ¼ wavelength plate portions and −¼ wavelength plate portions in the X-axis direction).

Figure 12:
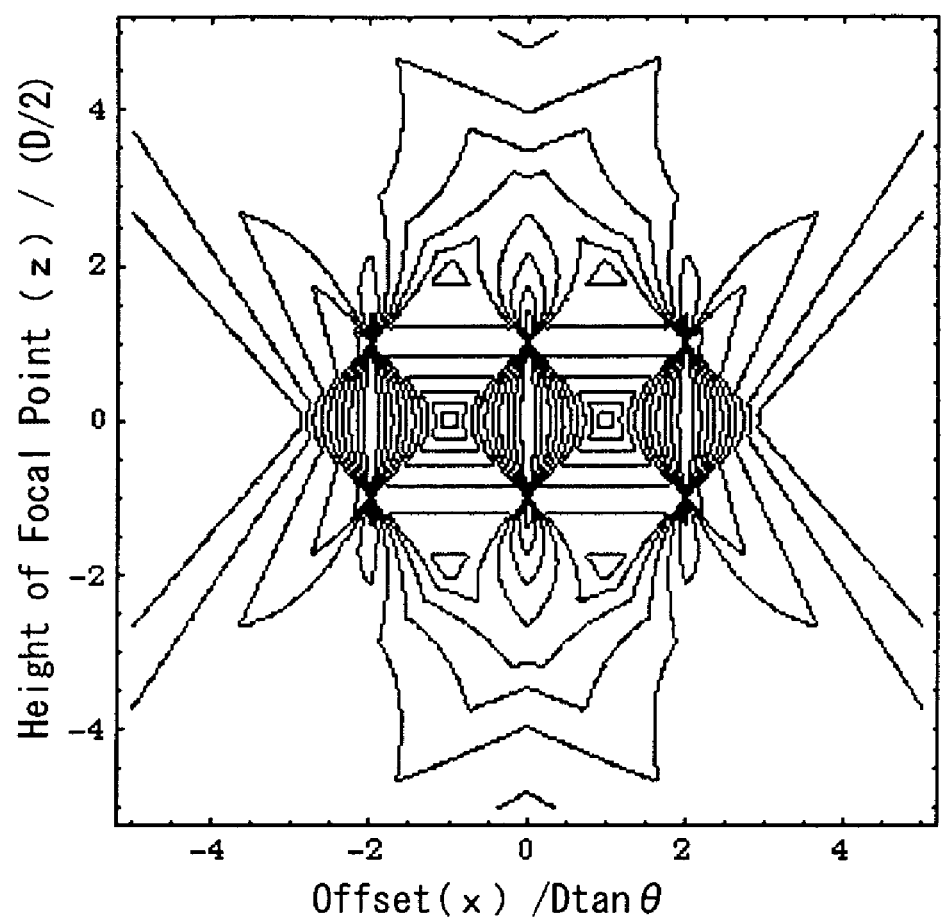
FIG. 12 is a graph showing coupling efficiency when the three slits are arranged in 2D tan θ pitch.

FIG. 12 is a graph showing coupling efficiency when the three slits are arranged in 2D tan θ pitch. In FIG. 12, the vertical axis is represented by the value of the position of Z-axis divided by (D/2), the horizontal axis is represented by the value of the X-axis divided by D tan θ. This graph is for the first optical element (4) and the second optical element (8) respectively having two ¼ wavelength plate portions and two −¼ wavelength plate portions, that is, respectively having three joint portions. It can be seen by comparing FIG. 12 and FIG. 11(B) that the optical device having three slits as shown in FIG. 12 has more areas with higher coupling efficiency compared to the optical device having one silt. It can also be seen that the area with higher coupling efficiency extends in the X-axis direction in accordance with the pitch of the slit, but not in the Z-axis direction. So images of the XY plane can be obtained within a certain Z value by increasing the number of slits (i.e., the number of the joint portions).

On the other hand, when required resolution in the X-axis direction cannot be achieved even with a photodetector having resolution capability of the slit pitch (pitch of the joint portion), images with high resolution can be obtained, for example, by detecting with several pixel columns arranged every pitch of silts. On the other hand, when the amount of lights to be obtained by each column are not equal, the position of the light source is preferred to be scanned as appropriate in order to average the amount of lights.

Manufacturing Method of the Optical Module

Next, the manufacturing method of the optical module of the present invention is explained. As explained above, the ¼ wavelength plate portion (1) and the −¼ wavelength plate portion (2) may respectively be formed with one or a plurality of the ¼ wavelength plates and the −¼ wavelength plates jointed alternately. In this case, for example, one or a plurality of the ¼ wavelength plates and the −¼ wavelength plates of the same shape are arranged alternately.

The optical element of the present invention may also be formed by merging one or a plurality of ¼ wavelength plates and −¼ wavelength plates together. In this case, for example, one or a plurality of the ¼ wavelength plates and the −¼ wavelength plates of the same shape are merged alternately together by heating. A plurality of wavelength plates may be joined together with adhesive material, although the performance of the optical module may deteriorate.

The optical element of the present invention may also be formed with crystal such as photonic crystal which have ¼ wavelength plate portions (1) and −¼ wavelength plate portions (2). The photonic crystal can be manufactured by a known manufacturing method of photonic crystal. The examples of the manufacturing method of photonic crystal are disclosed in WO2004-008196 or Japanese Patent Laid Open No. 2005-11/4704. On the other hand, more specific method for manufacturing photonic crystal is disclosed in Japanese Patent Laid Open No. 10-335758, in which the method for manufacturing optical elements comprising the steps of: forming layers with at least two kinds of materials sequentially and periodically on a substrate having two-dimensionally periodically recessed or projecting portions; and employing sputter etching either separately from film deposition or simultaneously with film deposition, at least in a part of the structure.

Imaging Device

Figure 13:
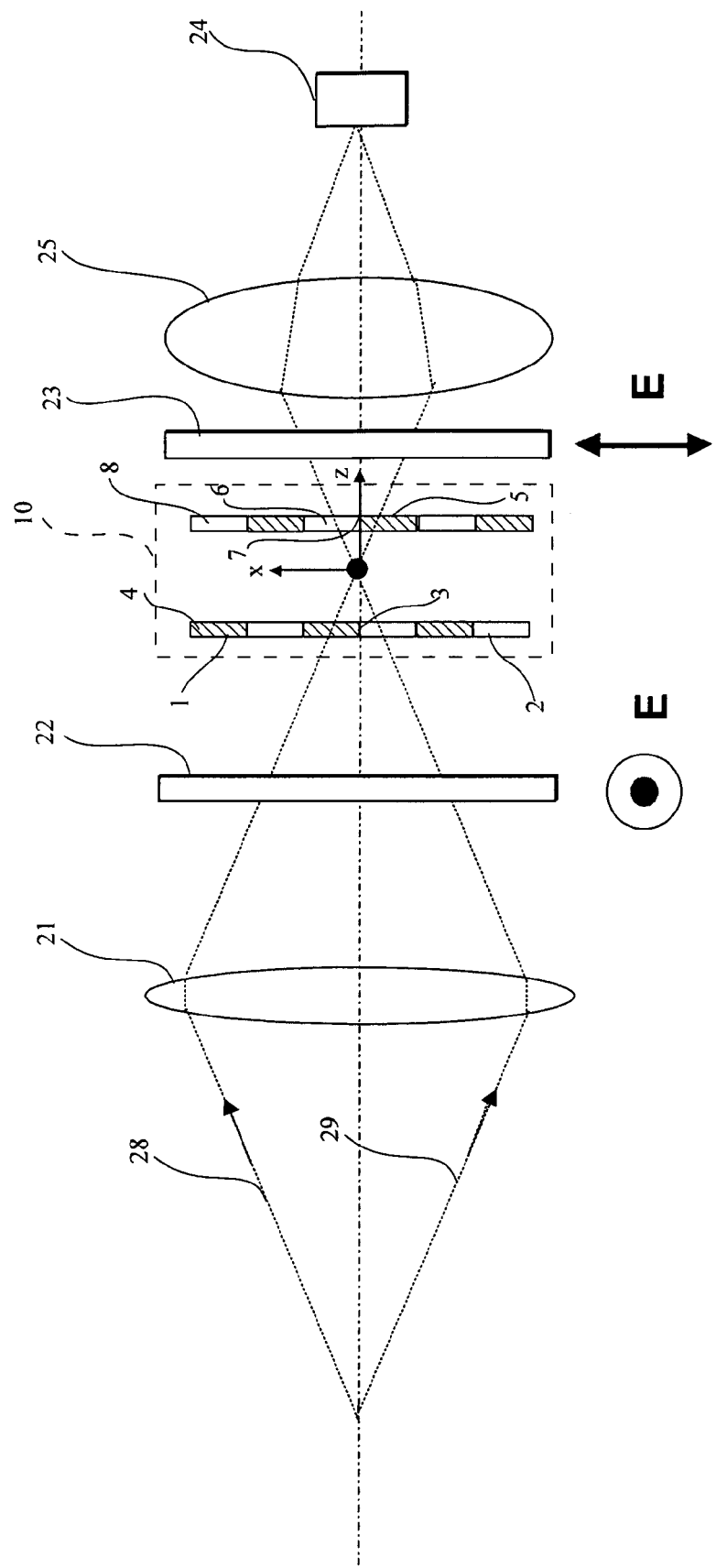
FIG. 13 is a schematic diagram showing an imaging device of the present invention.

Next, the imaging device according to the second aspect of the present invention is explained. FIG. 13 is a schematic diagram showing an imaging device of the present invention. As shown in FIG. 13, the imaging device of the present invention comprises: a lens (21); an optical module (10) wherethrough light from the lens (21) transmits; a first polarizer (22) for adjusting the polarization plane of the light, the light entering into the optical module (10); a second polarizer (23) for polarizing and separating the light, the light being outputted from the optical module (10); and a photodetector (24) for detecting light outputted from the second polarizer (23). The imaging device of the present invention can adopt all the embodiments of the optical module (10) so far explained as appropriate. The ordinary imaging device has an outer frame and the like, but they are omitted in FIG. 13.

The imaging device of the present invention can adopt the optical module (10) so far explained as appropriate. As shown in FIG. 1, the optical module used in the imaging device of the present invention basically comprises: a first plate-like optical element (4) formed with a ¼ wavelength plate portion (1) and a −¼ wavelength plate portion (2), the ¼ wavelength plate portion (1) and the −¼ wavelength plate portion (2) alternately being jointed together at a joint portion (3); and a second plate-like optical element (8) formed with a ¼ wavelength plate portion (5) and a −¼ wavelength plate portion (6), the ¼ wavelength plate portion (5) and the −¼ wavelength plate portion (6) alternately being jointed together at a joint portion (7), wherein the first optical element (4) and the second optical element (8) are parallel, and the ¼ wavelength plate portion (1) of the first optical element (4) and the −¼ wavelength plate portion (6) of the second optical element (8) are overlapped across a gap (9), and the −¼ wavelength plate portion (2) of the first optical element (4) and the ¼ wavelength plate portion (5) of the second optical element (8) are overlapped across the gap (9). In addition, the imaging device of the present invention, as appropriate, may adopt known components which are used for optical equipment and the like.

The specific operational example of the imaging device of the present invention is as follows. The polarization plane of light having entered into the lens (21) is adjusted by the first polarizer (22). And the light whose polarization plane is adjusted enters into the optical module (10). Then, as explained above, the polarization plane of the light having transmitted through the optical module (10) is adjusted depending on the part of the two optical elements (4, 8) composing the optical module (10) wherethrough the light transmits. And the second polarizer has a characteristic of transmitting or not transmitting the light whose polarization plane was adjusted. So the light is outputted or is not outputted form the second polarizer (23) depending on the part of the optical module (10) wherethrough the light transmits (i.e., depending on the combinations of the wavelength plate portions wherethrough the light transmits). Thus only light components which satisfy predetermined conditions can be extracted. And the light satisfying the predetermined conditions and being outputted from the second polarizer (23) is detected by the photodetector (24). In this way, the light which satisfies predetermined conditions is detected, and so the observation object which satisfies predetermined conditions (e.g., the object located in a predetermined spatial position) can be observed. Hereinafter, each component of the imaging device of the present invention is explained.

The imaging device is a device for observing observation objects. Specific examples of the imaging device include a camera, a video camera, a telescope, an astronomical telescope, an optical pickup device or an optical information reader.

The lens (21) gathers light being reflected from observation objects. As the lens, a focus lens which is used for a camera and the like can be used. It is preferred that the lens (21), the same as a focus lens of a camera, be movable and be able to adjust focal point. Namely, a preferred embodiment of the imaging device comprises a movable mechanism of the lens (21), thereby being able to adjust a focal point.

It is also preferred that a focal point of a lens be located in the gap (9) between the two optical elements (4, 8) contained in the optical module (10). Namely, it is preferred that the lens (21) have optical property that a focal point can be located in the gap (9) between the optical elements (4, 8). It is particularly preferred that the focal point of the lens (21), which is located in the fixed position, be located in the center of the gap (9) between the two optical elements (4, 8). The lens (21) should be adjusted as needed based on, for example, the positional relationship between the lens (21) and the optical module (10).

The first polarizer (22) is an optical element for adjusting the polarization plane of light. On the other hand, the second polarizer (23) is an optical element for transmitting only light components having a predetermined polarization plane. A publicly known polarizer can be used as the first polarizer (22) and the second polarizer (23) as appropriate. The first polarizer (22) and the second polarizer (23) are, for example, configured so that the polarization plane of the light which transmits therethrough is shifts by $\pi/2$.

The photodetector (24) is not specifically limited if it can detect light. A known photodetector which is used for a camera and a telescope can be used as appropriate. For example, when a camera or a video camera is used as an imaging device, a photodiode, a CCD, or a photodetection part of a camera can be adopted as a photodetector. When a telescope or an astronomical telescope is used as an imaging device, a detection part for megascopic observation can be adopted as a photodetector.

The photodetector (24) preferably comprises a plurality of detectors. The examples of the photodetector include imaging sensors such as photodiodes or CCDs. It is preferred that the number of the photodiodes or the CCDs be more than (S−1) and less than (S+1), when the sum of the ¼ wavelength plate portions and the −¼ wavelength plate portions of the first optical element (4) is represented by S (where S is over 2). When S is over 5, the number is preferably more than (S−2) and less than S, and is desirably (S−1). This is because if there are photodetectors (such as photodiodes and CCDs) which can detect lights corresponding to the joint portions between the ¼ wavelength plate portion and the −¼ wavelength plate portion, lights which satisfy predetermined conditions on a plurality of wavelength plates can be detected.

It is particularly preferred that the photodetector (24) is configured so that the pitch of the ¼ wavelength plate portion and the −¼ wavelength plate portion of the first optical element (4) (i.e., the width of the ¼ wavelength plate portion or the −¼ wavelength plate portion) equals to the pitch in the X-axis direction of CCDs and the like. And the pitch in the Y-axis direction of CCDs and the like may be equal to, shorter than, or longer than the pitch in the X-axis direction.

A plurality of photodetectors, for example, may be aligned so as to detect light components which have transmitted through several portions of the first optical element and the second optical element and outputted from the second polarizer by satisfying predetermined conditions. An embodiment of the imaging device of the present invention comprises a moving mechanism for moving the optical detector. For example, in particular, when a plurality of photodetectors are aligned, they can move in the long axis direction or in the short axis direction. In this way, if the photodetectors can move, spatial images can be obtained effectively even with fewer photodetectors.

Since the optical module and the imaging device of the present invention, for example, can extract light components located in predetermined locations, they can be used as new photographic devices and their optical components. Namely, the present invention can be preferably used in the field of optical equipment and the like.

What is claimed is:

1. An imaging device comprising:
    a lens (21);
    an optical module (10), wherethrough light from the lens (21) transmits;
    a first polarizer (22) for adjusting the polarization plane of the light entering into the optical module (10);
    a second polarizer (23) for polarizing and separating the light being emitted from the optical module (10); and
    a photodetector (24) for detecting light emitted from the second polarizer (23),
    wherein the optical module (10) comprises:
        a first plate-like optical element (4) formed with a ¼ wavelength plate portion (1) and a −¼ wavelength plate portion (2), the ¼ wavelength plate portion (1) and the −¼ wavelength plate portion (2) alternately being jointed together at a joint portion (3); and
        a second plate-like optical element (8) formed with a ¼ wavelength plate portion (5) and a −¼ wavelength plate portion (6), the ¼ wavelength plate portion (5) and the −¼ wavelength plate portion (6) alternately being jointed together at a joint portion (7),
        wherein the first optical element (4) and the second optical element (8) are parallel,
        wherein the ¼ wavelength plate portion (1) of the first optical element (4) and the −¼ wavelength plate portion (6) of the second optical element (8) are overlapped across a gap (9), and
        wherein the −¼ wavelength plate portion (2) of the first optical element (4) and the ¼ wavelength plate portion (5) of the second optical element (8) are overlapped across the gap (9), or
    wherein the optical module (10) comprises:
        a first plate-like optical element (4) formed with a ¼ wavelength plate portion (1) and a −¼ wavelength plate portion (2), the ¼ wavelength plate portion (1) and the −¼ wavelength plate portion (2) alternately being jointed together at a joint portion (3); and
        a second plate-like optical element (8) formed with a ¼ wavelength plate portion (5) and a −¼ wavelength plate portion (6), the ¼ wavelength plate portion (5) and the −¼ wavelength plate portion (6) alternately being jointed together at a joint portion (7),
        wherein the first optical element (4) and the second optical element (8) are parallel,
        wherein the ¼ wavelength plate portion (1) of the first optical element (4) and the ¼ wavelength plate portion (5) of the second optical element (8) are overlapped across a gap (9), and
        wherein the −¼ wavelength plate portion (2) of the first optical element (4) and the −¼ wavelength plate portion (6) of the second optical element (8) are overlapped across the gap (9).

2. The imaging device as claimed in claim 1, wherein the optical module (10) further comprises a movable mechanism, the movable mechanism moving the optical module (10) in the jointing directions, whereby the ¼ wavelength plate portion (1) and the −¼ wavelength plate portion (2) are alternately jointed at the joint portion (3).

* * * * *